United States Patent
Nielsen

(10) Patent No.: US 10,711,465 B2
(45) Date of Patent: Jul. 14, 2020

(54) FASTENING DEVICE AND SYSTEM OF FASTENING PANELS TO A STRUCTURE

(71) Applicant: KVADRAT SOFT CELLS A/S, Ebeltoft (DK)

(72) Inventor: Jesper Nielsen, Hamburg (DE)

(73) Assignee: KVADRAT SOFT CELLS A/S, Ebeltoft (DK)

( * ) Notice: Subject to any disclaimer, the term of this patent is extended or adjusted under 35 U.S.C. 154(b) by 0 days.

(21) Appl. No.: 16/344,572

(22) PCT Filed: Oct. 24, 2016

(86) PCT No.: PCT/IB2016/056380
§ 371 (c)(1),
(2) Date: Apr. 24, 2019

(87) PCT Pub. No.: WO2018/078416
PCT Pub. Date: May 3, 2018

(65) Prior Publication Data
US 2019/0277037 A1   Sep. 12, 2019

(51) Int. Cl.
*E04F 13/08* (2006.01)
*E04B 9/00* (2006.01)
*E04B 9/04* (2006.01)

(52) U.S. Cl.
CPC .......... *E04F 13/0805* (2013.01); *E04B 9/003* (2013.01); *E04F 13/0812* (2013.01); *E04F 13/0858* (2013.01); *E04B 2009/0492* (2013.01)

(58) Field of Classification Search
CPC .............. E04F 13/0805; E04F 13/0812; E04F 13/0858; E04F 13/0803; E04B 9/003; E04B 2009/0492
See application file for complete search history.

(56) References Cited

U.S. PATENT DOCUMENTS 6,988,344 B1 * 1/2006 Krueger ................ F16B 5/0614
52/464
8,857,113 B2 * 10/2014 Zhang .................. H01L 31/048
52/173.3

(Continued)

FOREIGN PATENT DOCUMENTS

| EP | 1559846 A1 | 8/2005 |
| JP | 2003/321890 A | 11/2003 |
| WO | WO 2018/078416 A1 | 5/2018 |

OTHER PUBLICATIONS

European Patent Office, International Search Report in International Application No. PCT/IB2016/056280 (dated Jun. 29, 2017).

(Continued)

*Primary Examiner* — Beth A Stephan
(74) *Attorney, Agent, or Firm* — Neal, Gerber & Eisenberg LLP; Thomas E. Williams; Daniel Organ

(57) ABSTRACT

A fastening device and a panel system for releasably connecting panels to a wall or ceiling, comprising a latch portion; a base portion; a piston guide; a push latch piston movably arranged and biased between a first retracted position and a second, extended position, wherein a guide track is formed in the push latch piston, and wherein a guide pin is formed on the piston guide, the guide track formed in sections forming an angle to each other, with arrests for the guide pins formed at intersections of the sections, and wherein, when the piston guide is moved relative to the push latch piston towards the retracted position, the guide pin rotates the latch portion to an intermediate position, and when the piston guide is moved back, the guide pin rotates the latch portion from the intermediate position to 90° relative to the initial rest position.

14 Claims, 14 Drawing Sheets

(56) References Cited

U.S. PATENT DOCUMENTS

| | | |
|---|---|---|
| 9,359,770 B1 | 6/2016 | Bilge |
| 2012/0186170 A1* | 7/2012 | Macdonald ......... E04F 13/0805 52/235 |
| 2018/0216350 A1* | 8/2018 | Marques Da Silva Macedo ........ E04F 13/0805 |

OTHER PUBLICATIONS

European Patent Office, Written Opinion of the International Searching Authority in Application No. PCT/IB2016/056380 (dated Jun. 29, 2017).

* cited by examiner

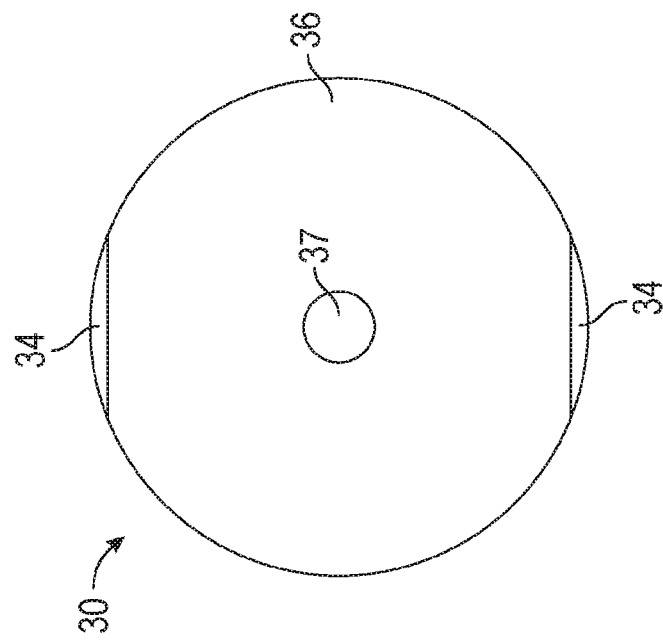
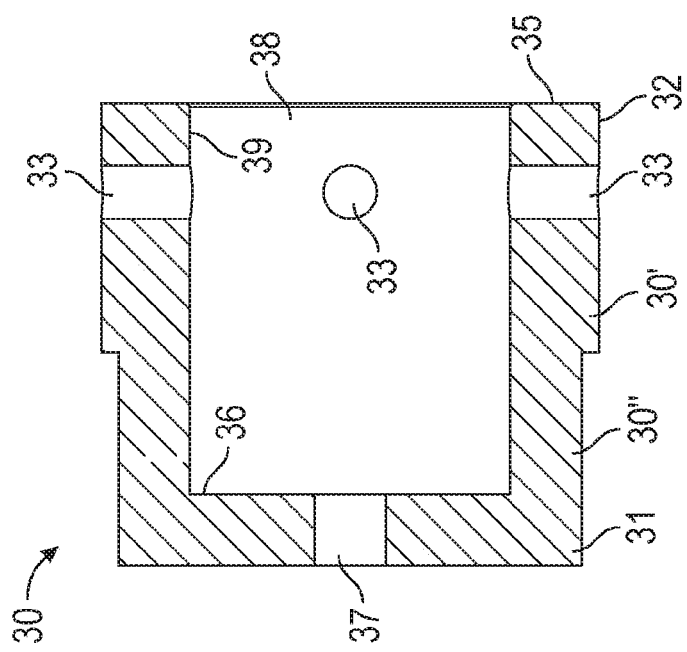
FIG. 6
FIG. 5

FASTENING DEVICE AND SYSTEM OF FASTENING PANELS TO A STRUCTURE

The present invention relates to a fastening device, such as a push latch for interchangeably connecting a panel to a support structure, the support structure being connectable to a surface such as a ceiling or a wall of a building. The invention further relates to a system for interchangeably connecting panels to a wall or a ceiling, the system comprising a panel, a support structure, and a fastening device (push latch)

BACKGROUND OF THE INVENTION/BACKGROUND ART

In many buildings it is desirable to be able to conceal various structures such as heating or water pipes, electrical wiring etc. Therefore, systems for providing panels in ceilings or on walls are known in the art. Such paneling of ceiling or walls may also be used to provide improved acoustic properties in a room.

Such panels are typically mounted to the wall or ceiling via a support structure or frame comprising beams or flanges whereto a portion of the panel may be secured. It is desirable if the mounting of the panels is interchangeable such that the panels may be removed for inspection of the concealed space behind the panels, once the panels have been mounted. It is also desirable if the panels may be removed or opened without the use of tools.

For this purpose it is known to use various type of releasable locks. One such example is disclosed in WO 2016/044385 A1.

A problem with the panel system and the lock disclosed is that it is very complex, and therefore expensive to manufacture, and difficult to maintain. Further, the disclosed lock is very space-consuming, which is undesirable.

DISCLOSURE OF THE INVENTION

On this background, it is an object of the present invention to provide a simple, cost efficient assembly lock and system for releasably connecting a panel to a support structure.

In a first aspect of the invention, these objects are achieved by providing a fastening device, such as push latch/compression latch, for releasably connecting a panel to a support structure, the panel comprising at least one locking track for receiving a latch portion of the fastening device, the fastening device latch comprising:
  a latch portion for connecting the fastening device to a panel;
  a base portion for connecting the fastening device to the support structure (300);
  a piston guide extending from the base portion;
  a push latch piston movably arranged relative to the piston guide between a first retracted position and a second, extended position, the latch portion being arranged on the push latch piston;
  a resilient member arranged to bias the push latch piston towards the extended position;
  wherein a guide track is formed in a surface of the push latch piston or in a facing surface of the piston guide,
  wherein at least one guide pin is formed on the other one of the surface of the push latch piston or the facing surface of the piston guide, the guide track being configured to receive the guide pin,
  wherein the guide track has two opposed ledges,
  wherein the guide track is formed in sections forming an angle to each other,
  wherein arrests for the guide pins are formed at intersections of the sections, and
  wherein,
    when no external force is applied to the fastening device, the at least one guide pin is biased into contact with one arrest at the first ledge by the resilient member, such that the push latch piston is in the extended position relative to the piston guide, in an initial rest position,
    when the piston guide is moved relative to the push latch piston towards the retracted position against the bias of the resilient member, the guide pin interacting with the guide track rotates the latch portion relative to the initial rest position to an intermediate position, and
    when the piston guide is subsequently moved back relative to the push latch piston and towards the extended position by the bias of the resilient member, the guide pin interacting with the guide track rotates the latch portion from the intermediate position to 90° relative to the initial rest position.

Thereby, a very simple, simple to manufacture, simple to use, and cost efficient fastening device for releasably connecting a wall or ceiling pane to a frame (support structure) may be achieved.

In an embodiment, the support structure comprises at least one flange configured for connecting to a base portion of the fastening device.

Preferably, the intermediate position, to which the guide pin interacting with the guide track rotates the latch portion, is 30-70° relative to the initial rest position. More preferably, when push latch piston is moved from its initial rest position, the latch portion is rotated 40-60° relative to the initial rest position. Even more preferably, when the push latch piston is moved from its initial rest position, the latch portion is rotated 45° relative to the initial rest position. The angle of the rotational movement is achieved by a suitable configuration of the length of each of the sections of the guide track. If a 45° rotation is desired the length of the sections 70', 70" must be equal.

The guide track is preferably an endless track in that it circumvents a portion of the push latch piston or the piston guide. The guide track preferably forms a zig-zag pattern around the surface in which it is formed.

Further, the alternating pattern of the guide track sections forms edges. The edges are formed at the convex side of the intersection, and the arrests are formed at the concave side of the intersections.

Looking along either of the two ledges in one direction, the arrests and the edges are repeated: arrest, edge, arrest, edge, . . . , such that the guide pin will encounter them in that order, when rotating as described above.

Each ledge may preferably comprise four arrests. Each ledge may preferably comprise four edges.

Preferably, the resilient member arranged to bias the push latch piston towards the extended position is arranged between a wall of the push latch piston and a wall of the piston guide (or a wall of the base).

The push latch piston arranged movably relative to the piston guide between the first, retracted position and the second, extended position, may be arranged inside the piston guide. Preferably, the outer shape of at least a portion of the push latch piston is cylindrical, and the inner surface of at least a portion of the piston guide is also cylindrical in order to allow also, rotation between the two. In this case, the piston guide is formed as a tube shaped member.

In this case, the guide track is preferably a groove formed in an outer surface of a main body portion of a push latch piston, and the one or more guide pins may be formed on the inner surface of the guide member, and extending from this inner surface, and into the guide track. Alternatively, the guide pins and the guide track may be reversed between the push latch piston and the piston guide.

Preferably, the resilient member arranged to bias the push latch piston towards the extended position is arranged in a space inside the push latch piston, and between, and abutting a wall of both the push latch piston, and the piston guide (or the base). Preferably the resilient member is a spring.

In alternative embodiments, the piston guide may be arranged inside the push latch piston. In this case, the outer shape/surface of at least a portion of the piston guide is cylindrical, and an inner surface of at least a portion of the push latch piston is also cylindrical in order to allow also, rotation between the two. In this case a portion of the push latch piston may be tube shaped. Also, in this case the guide track and the guide pins may be formed on opposite ones of either the inner cylindrical surface of the push rod piston, or at the outer cylindrical surface of the piston guide. Preferably, the resilient member arranged to bias the push latch piston towards the extended position is arranged in a space inside the, and between, and abutting a wall of both the push latch piston, and the piston guide (or the base). Also in this case, the resilient member is preferably a spring.

In a further embodiment, in addition to the features of any of the above described embodiments, an intersection of two ledge sections forms an edge, which is located opposite to an arrest, formed on the opposite ledge, and arranged such that, when the piston guide is moved relative to the push latch piston between the retracted and the extended position, or vice versa, rotation of the push latch piston relative to the piston guide is only allowed in one direction.

In a further embodiment, the latch portion has two opposed latches. Thereby, if the panel has a track with two flanges, a very stable connection between the panel and the push latch (and thereby the support structure) may be obtained. As may be appreciated from this, preferably the push latch base is connected to the support structure, and the latch portion connects to a locking track on the panel. However, in principle the push latch base may be connected to a portion of a panel, and the latch portion being adapted for cooperation with a locking track configured in the support structure.

In a further embodiment, in addition to the features of any of the above-described embodiments, a locking groove is formed between a main body portion of the push latch piston and the latch portion. The locking groove preferably forms a cylindrical outer surface of a portion of the push latch piston, which circumvents the push latch piston and has a smaller diameter than the main body portion of the push latch piston and the largest/maximal extent of the latch portion. Preferably, the diameter of the locking groove is identical with (or smaller) than the width of the latch portion.

In a further embodiment, in addition to the features of any of the above-described embodiments, a maximal outer dimension of the at least one guide pin is smaller than the width of the guide track. Preferably, the guide pin has a cylindrical shape, and the maximal outer dimension is identical to the diameter of the cylindrical guide pin. When the guide pin is smaller than the width of the guide track a play between the push latch piston and the piston guide is allowed, which aids the release of the guide pin from the arrests.

In a further embodiment, in addition to the features of any of the above-described embodiments, a spinning member is arranged between the resilient member and the push latch piston. The spinning member prevents torsion of the resilient piston. The spinning member preferably has a guide for interacting with and supporting the resilient member and surface portion in the opposite end relative to the guide, which is adapted to abut on a surface of the push latch piston, such that there is minimal friction between the spinning member and the just mentioned surface of the push latch piston. The surface portion may be formed on a conical part.

In a preferred embodiment, the guide groove is formed on an external surface of a cylindrical main body portion of the push latch piston, and the at least one guide pin extends from an inner surface of a cylindrically formed piston guide.

In a further embodiment, in addition to the features of any of the above-described embodiments, the latch portion is formed integral with the push latch piston. However, they may alternatively be formed individually, and assembled into a unit.

In a further embodiment, in addition to the features of any of the above-described embodiments, the latch portion and/or the push latch piston is formed in a metal, e.g. aluminum or stainless steel. Alternatively, the latch portion and/or the push latch piston may be formed in plastic.

In a further embodiment, in addition to the features of any of the above-described embodiments, the piston guide may be formed in a metal, e.g. aluminum or stainless steel. Alternatively, the piston guide may be formed in plastic.

In a further embodiment, in addition to the features of any of the above-described embodiments, the base of the push latch may be formed in a metal, e.g. aluminum or stainless steel. Alternatively, the base of the fastening device may be formed in plastic.

In some embodiments, the base of the fastening device and piston guide the may be formed as an integral unit. However, preferably, the base of the fastening device and the piston guide are formed as individual pieces, and subsequently assembled. The base of the fastening device and the piston guide may be connected by a press fit. Preferably, the base of the fastening device and the piston guide comprises mating surfaces.

In a second aspect of the invention, the objects of the invention are achieved by providing a panel system for releasably connecting panels to a wall or a ceiling, the system comprising at least one panel, a support structure (or frame), and at least one fastening device. The panel comprises at least one locking track for receiving a latch portion of the fastening device. The fastening device comprises the features of any one of the embodiments according to the first aspect, described above.

Thereby, a very simple, simple to manufacture, simple to use, and cost efficient panel system with a very simple, simple to manufacture, simple to use, and cost efficient fastening device for releasably connecting a wall or ceiling pane to a frame (support structure) may be achieved.

In an embodiment, the support structure may comprise at least one flange configured for connecting to a base portion of the fastening device.

As may be appreciated from the above, preferably the push latch base is connected to the support structure, and the latch portion connects to a locking track on the panel. However, in principle, the push latch base may be connected to a portion of a panel, and the latch portion being adapted for cooperation with a locking track configured in the support structure.

In an embodiment, an intersection of two ledge sections forms an edge, which is located opposite to an arrest formed on the opposite ledge, and arranged such that, when the piston guide is moved relative to the push latch piston between the retracted and the extended position, or vice versa, rotation of the push latch piston relative to the piston guide is only allowed in one direction.

In a further embodiment, in addition to the features of any of the above-described embodiments, the latch portion has two opposed latches, each having a locking surface, and the locking track of the panel comprises flanges with surfaces configured for cooperating with locking surfaces on the latch portion.

In a further embodiment, in addition to the features of any of the above-described embodiments, a locking groove is formed between a main body portion of the push latch piston and the latch portion, and a width between edges of the flanges is configured to be substantially the same as the maximum dimension of the locking groove. The locking groove is preferably cylindrical in shape, and in this case the maximum dimension is the diameter thereof.

In a further embodiment, in addition to the features of any of the above-described embodiments, a depth of the locking groove is substantially equivalent with the length of the latch portion from a foremost tip of the latch portion to the locking surfaces of the push latch piston. Thereby, it is assured that the latch portion maybe stably secured in the locking track, and in a manner that allows release of the fastening device again, by allowing abutment of the foremost tip of the latch portion with the bottom surface of the locking track, such that another push on the fastening device will provide a new set of rotations as mentioned in claims 1 and 7, but from a new rest position, where the latch portion is transverse to the locking track in the panel.

By depth of the locking track is meant the distance from the bottom surface of the locking track to the surfaces of the flanges of the locking track, configured for cooperating with locking surfaces on the latch portion.

In a further embodiment, in addition to the features of any of the above-described embodiments, the height of the fastening device, when the push latch piston is in the retracted position is substantially equivalent to, or greater than, the distance from a frame abutment surface of the panel to a bottom surface of the locking groove.

By the height of the fastening device, is meant the distance from the foremost tip of the latch portion to the bottom of the base of the fastening device. The bottom of the base is the surface configured for abutment with the support structure/frame.

The frame abutment surface of the panel is the uppermost surface of the panel, which is on the back side, i.e. the side facing the wall or ceiling.

When the height of the fastening device, when the push latch piston is in the retracted position is substantially equivalent to, or greater than, the distance from a frame abutment surface of the panel to a bottom surface of the locking groove, it is secured that the full range of the movement of push latch piston is possible, whereby the panels may connected to the frame.

In a further embodiment, in addition to the features of any of the above-described embodiments, the difference between the height of the fastening device, when the push latch piston is in the extended position and the height, when the push latch piston is in the retracted position, is 4-20 mm, such as 5-15 mm, such 6-10 mm. Thereby, a suitable distance between the frame/support structure is secured allowing operation of the fastening device and thereby easy mounting and unmounting of panels to/from the frame/support structure.

In a further embodiment, in addition to the features of any of the above-described embodiments, a panel may further be connected to a flange of the support structure via at least one hinge joint. Thus, the panel is connected to the support structure by at least on hinge joint and a fastening device as described above. Thereby, the panel may be mounted permanently to the support structure, but easily opened like a door or hatch, by manipulating the fastening device.

In accordance with the invention according to the second aspect, the fastening device/push lock of the panel system as described in any of the embodiments described above, may further comprise any of the features of described in connection with the invention according to the first aspect of the invention.

Further objects, features, advantages and properties of the fastening device and the panel system according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which:

FIG. 5, in a sectional side view, shows the piston guide of FIG. 4;

FIG. 6, in a bottom view, shows the piston guide of FIG. 4 from beneath;

DETAILED DESCRIPTION OF THE INVENTION

Figure 1:
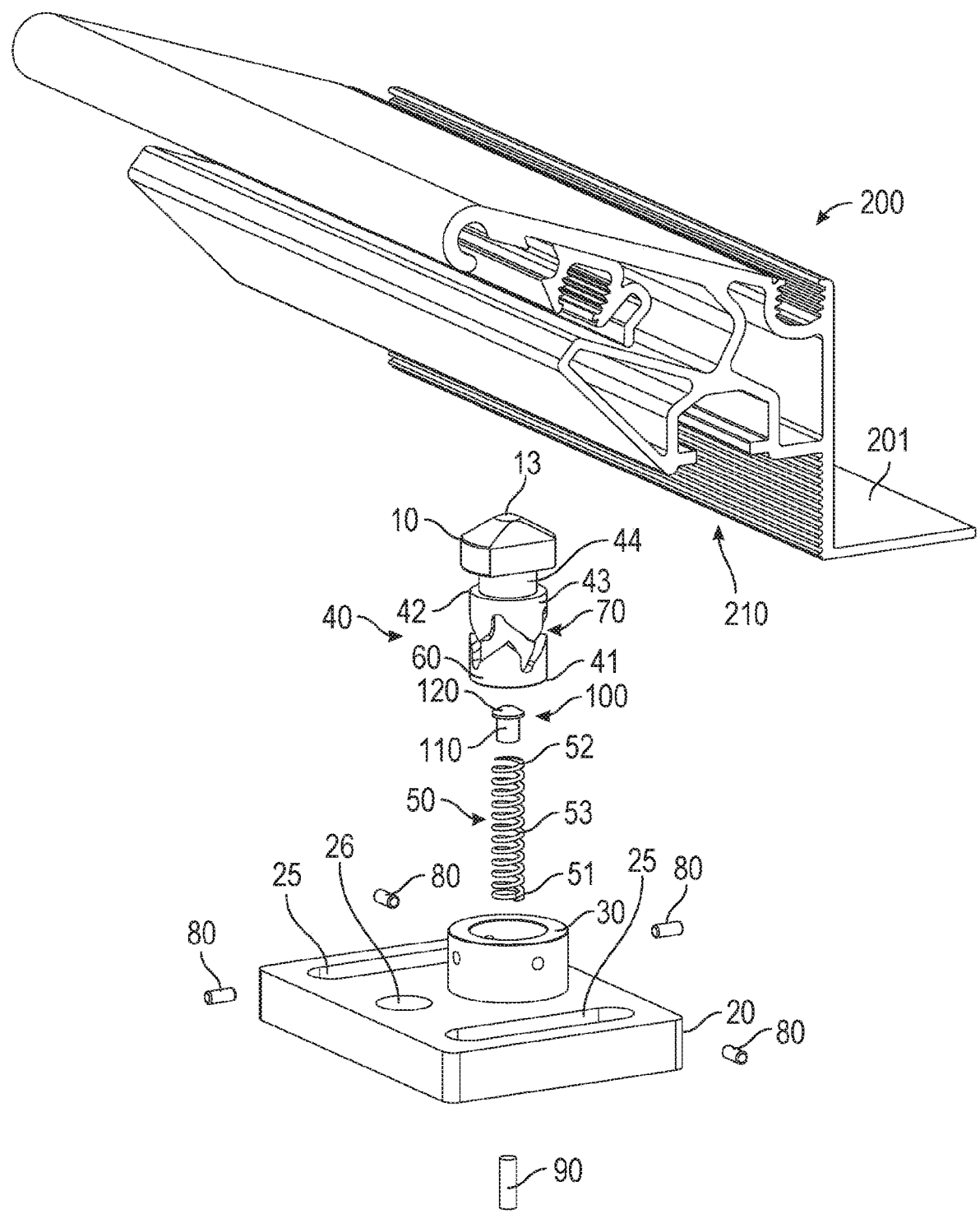
FIG. 1, in a perspective view, shows a part of a panel and in exploded view of a fastening device such a push latch according to the present invention.

In the following, details of the fastening device 1 and the panel system 500 according to the invention will be described by the preferred embodiments. The fastening device 1 may be a push latch/compression latch 1. Hereinafter the fastening device will be referred to as push latch 1.

The construction and operation of a wall/ceiling panel 200 and a corresponding support structure/frame 300 is as such well-known, and should not require further explanation in the present context.

Further details regarding the operation of the push latch 1 and the wall/ceiling panel 200 and a corresponding support structure/frame 300 are provided below.

FIG. 1 shows a first exemplary embodiment of a push latch 1 and a rim portion 201 of the wall/ceiling panel (200), which is particular suitable for a panel system according to the invention. The rim portion 201 may be formed around the perimeter of the entire panel 200, as indicated in FIGS. 11A-D. Preferably, the panels are rectangular, such as square, but may have other shapes, e.g. circular or polygonal forms.

The push latch 1 allows for releasably connecting a panel 200 to a support structure 300 (not shown in FIG. 1).

Figure 2A:
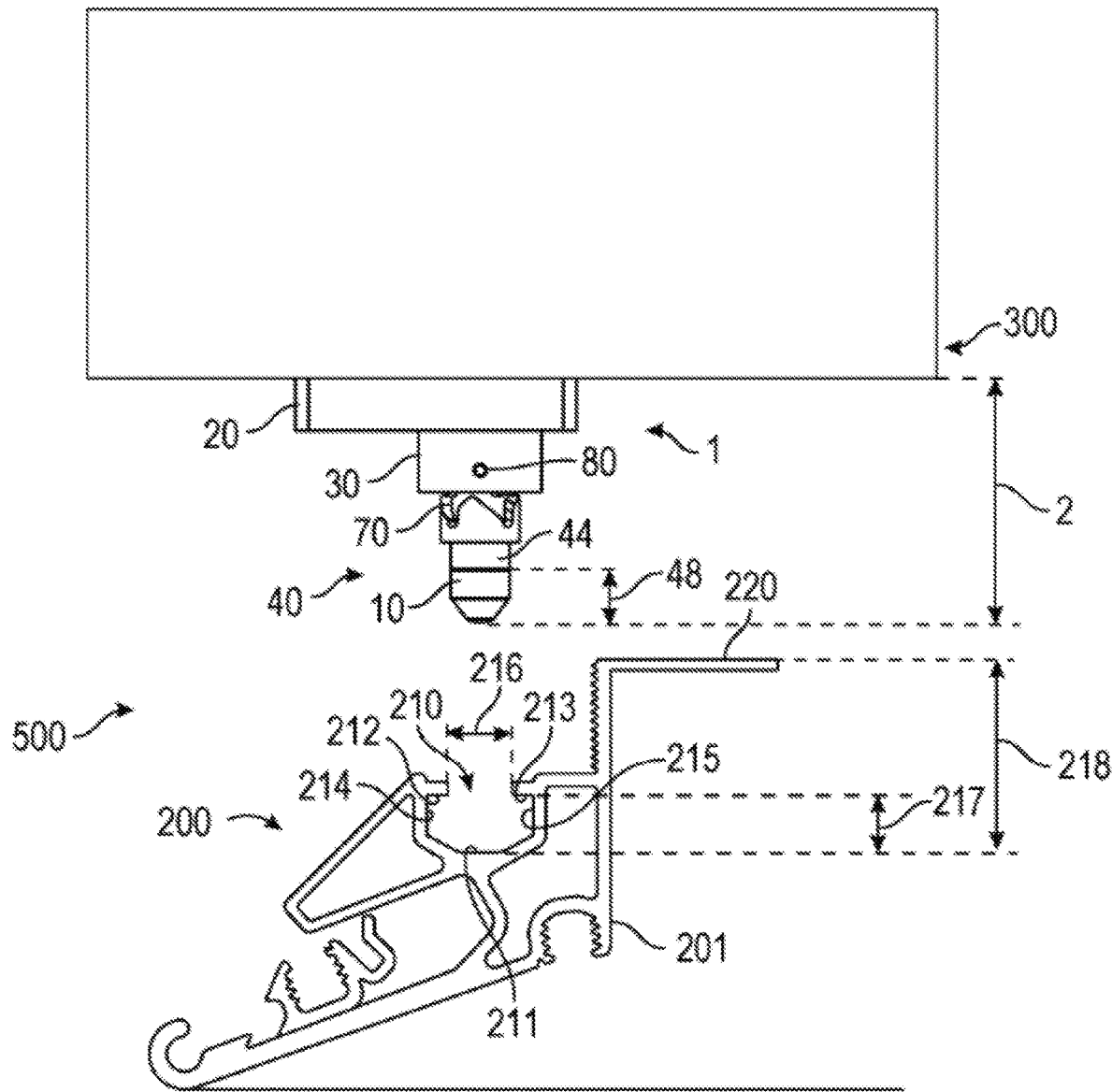
FIG. 2A, in a partly sectional side view, shows a panel system, with a panel, a push latch and a support structure according to the invention. The figure shows the push latch connected to the support structure, and the panel in a disassembled state. The a push latch piston is biased against its most extended position.
Figure 2C:
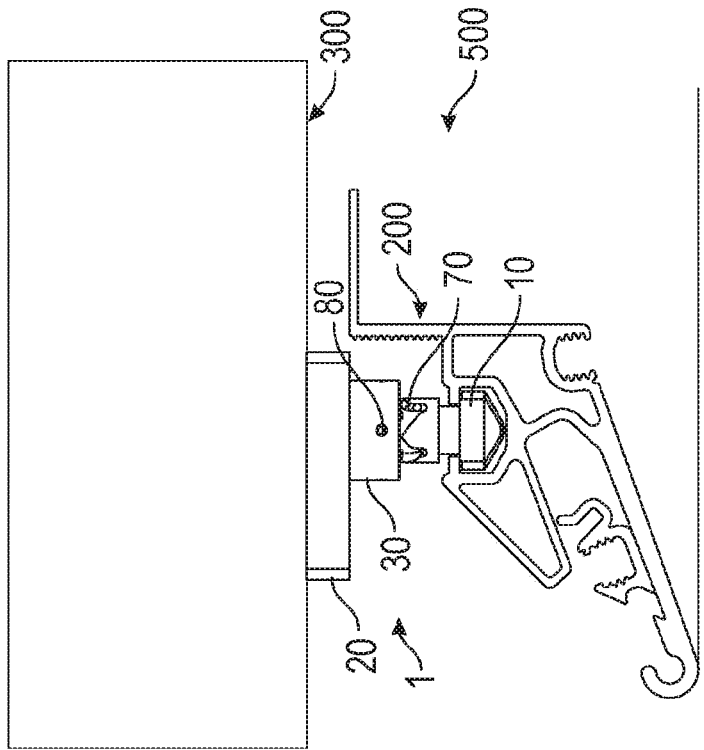
FIG. 2C, shows the panel system of FIGS. 2A and 2B, where the panel is secured to the support structure. The a push latch piston is biased against its most extended position again.
Figure 2B:
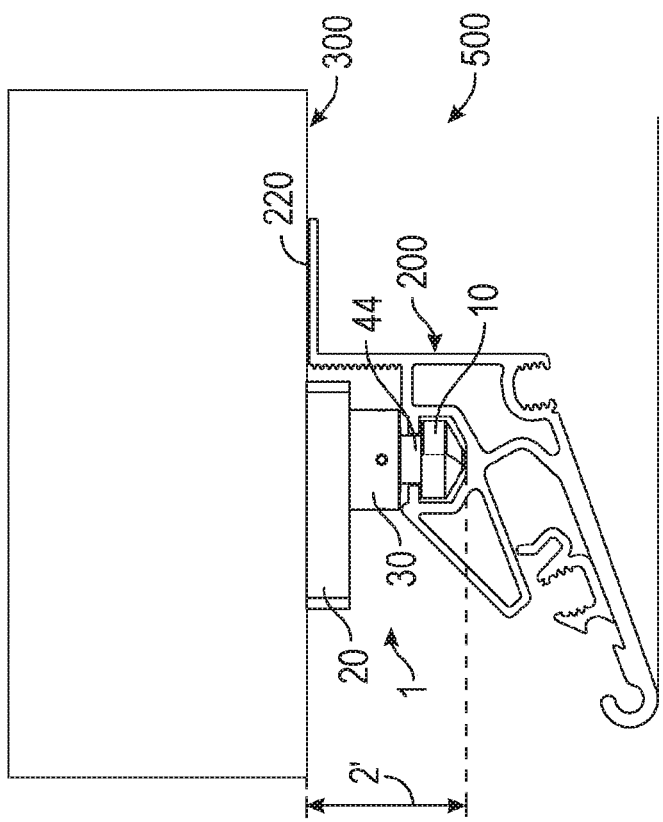
FIG. 2B, shows the panel system of FIG. 2A, where the panel is pushed towards the support structure, and where a push latch piston is pushed towards a retracted position.

The panel 200 comprises, at least one locking track 210 for receiving a latch portion 10 of the push latch 1, see e.g. FIGS. 2A-C.

Throughout the description, the support structure 300 is only depicted in sketched form. However, the support structure 300 comprises at least one flange 310, which is configured for connecting to a base portion 20 of the push latch 1. The base portion 20 is depicted in e.g. FIG. 1, and the flange 310 of the support structure 300 can be seen in e.g. FIGS. 11A-D.

The base portion 20 of the fastening device 1/push latch 1 may be secured to the flange 310 by adjoining a bottom surface 21 of the base portion 20 with the flange 310, and securing the base portion 20 to the flange 310, using fasteners such as screws or bolts trough the holes 25 or 26 formed through the base portion 20. Other connection means may be conceivable.

The flange 310 may be of e.g. the uni-strut type.

Referring now to FIG. 2A, the locking track 210 of the panel 200 comprises two parallel, elongate flanges with an opening formed there between. The width of the opening is designated 216 in FIG. 2A. Inside of the opening, the locking track has two side walls 214, 215, respectively, and a bottom 211. The flanges defining the opening in the locking track 210, on the inside and facing the bottom 211 of the locking track 210 has respective surfaces 212, 213 configured for abutment with a surface 14 of a latch portion 10 of the push latch 1, see e.g. FIG. 7.

A depth 217 of the locking track 210 of the panel 200 is defined in FIG. 2A as the distance between the bottom 211 of the locking track 210 to the underside of the flanges, i.e. respective surfaces 212, 213 configured for abutment with a surface 14 of a latch portion 10.

The cross sectional shape of the locking track 210 may be resembled to a C-shaped flange/beam.

Also shown in FIG. 2A is the distance 218 from the bottom of the locking track 210 of the panel 200 to a frame abutment surface 220 of the panel 200. The frame abutment surface 220 of the panel 200 is the uppermost surface of the panel, which is on the back side, i.e. the side facing the wall or ceiling, when mounted.

Now referring again to FIG. 1, the push latch 1 comprises a latch portion 10 for connecting the push latch 1 to a panel 200, more precisely to a locking track thereof. The push latch 1 further comprises a base portion 20 for connecting the push latch 1 to the support structure 300, as mentioned above. Further, the push latch 1 comprises a piston guide 30 connected to and extending from the base portion 20, and a push latch piston 40.

The push latch piston 40 is arranged movably relative to the piston guide 30. As shown in FIG. 1, the piston guide 30 may have a tubular structure, and the push latch piston 40 has a generally cylindrical shape, the push latch piston being received in the space 38 formed in the tubular piston guide 30 (see FIG. 5).

The push latch piston 40 is moveable relative to the piston guide 30 between a first, retracted position and a second, extended position. The fully extended position of the push latch piston 40 can be appreciated in FIGS. 2A (and 3A), 2C (and 3C), 11C, and 11D. The fully retracted position can be appreciated from FIG. 2B (and 3B).

Figure 7:
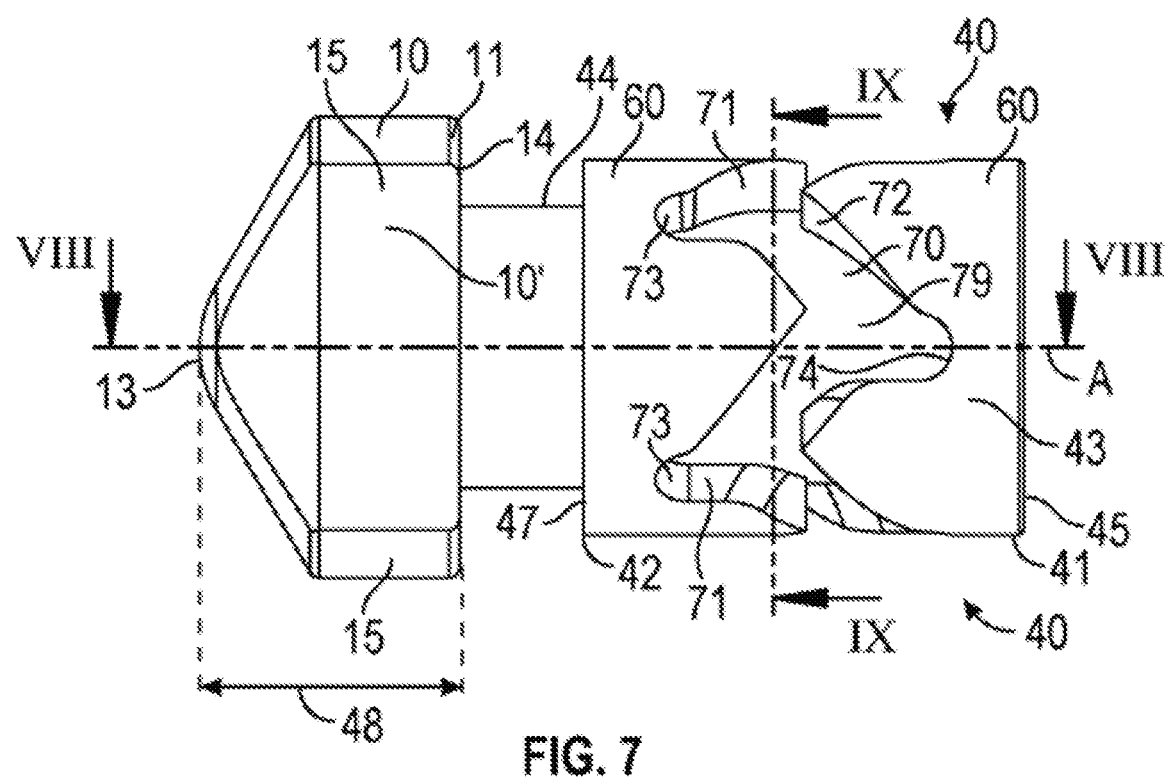
FIG. 7, in a side view, shows an embodiment of a push latch piston according to the invention.

The push latch piston 40, see also FIG. 7, has a main body 43 having a generally cylindrical shape with a first end 41 and a second end 42. At the first end 41, the push latch piston has a first end wall 45 providing for abutment with a bottom wall 36 of the piston guide 30 (see FIG. 5). At the second, opposite end 42 the main body 43 of the push latch piston 40 has a second ring shaped end wall 47. From the second end wall 47, a cylindrical locking groove 44 extends. The locking groove 44 connects the main body 43 with the latch portion 10, being arranged on the push latch piston 40. The diameter of the locking groove 44 is smaller than the diameter of the main body 43. Further, the diameter of the locking groove 44 is smaller than one dimension, B, of the latch portion 10, where two opposed latches 15 extends. In the transverse direction, another dimension, C, of the latch portion 10 is substantially equal to the diameter of the locking groove 44, as may be appreciated by comparing FIGS. 7 and 8, for example.

Figure 10:
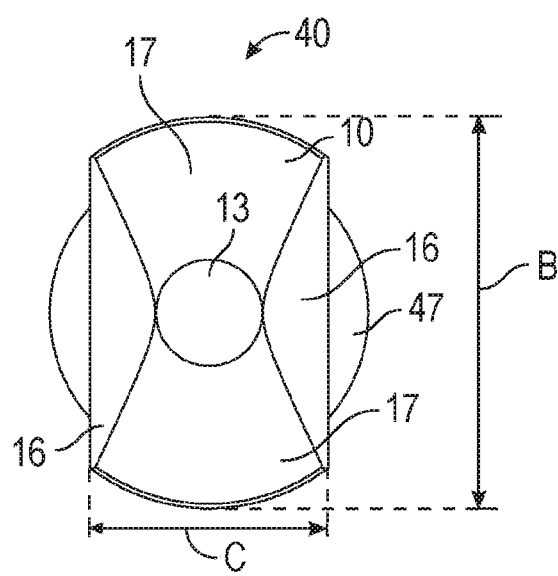
FIG. 10 shows a front view of the push latch piston of FIG. 7.

The diameter of the locking groove 44 and the smaller dimension, C, of the latch portion 10 corresponds to the width 216 of the opening in the locking track 210 of the panel 200. Thereby, if the latch portion 10 is correctly positioned, the latch portion 10 and partially the locking groove 44 may enter into the locking track 210 of the panel 200. When the latch portion 10 is turned, when inside the locking track 210, the larger dimension B of the latch portion in the direction of the latches 15 (see FIG. 10), allows the locking surface 14 of latch portion 10 to interact with the inner surfaces 212, 213, and thereby lock the push latch piston 40 to the locking track 210 of the panel 200. This will be described in further detail below. The outer surface of the latch portion 10 comprises beveled surfaces 16, 17 allowing the latch portion 10 to be rotated relative to the locking track 210.

Preferably, the overall shape of the latch portion 10 matches the profile of the locking track.

Figure 8:
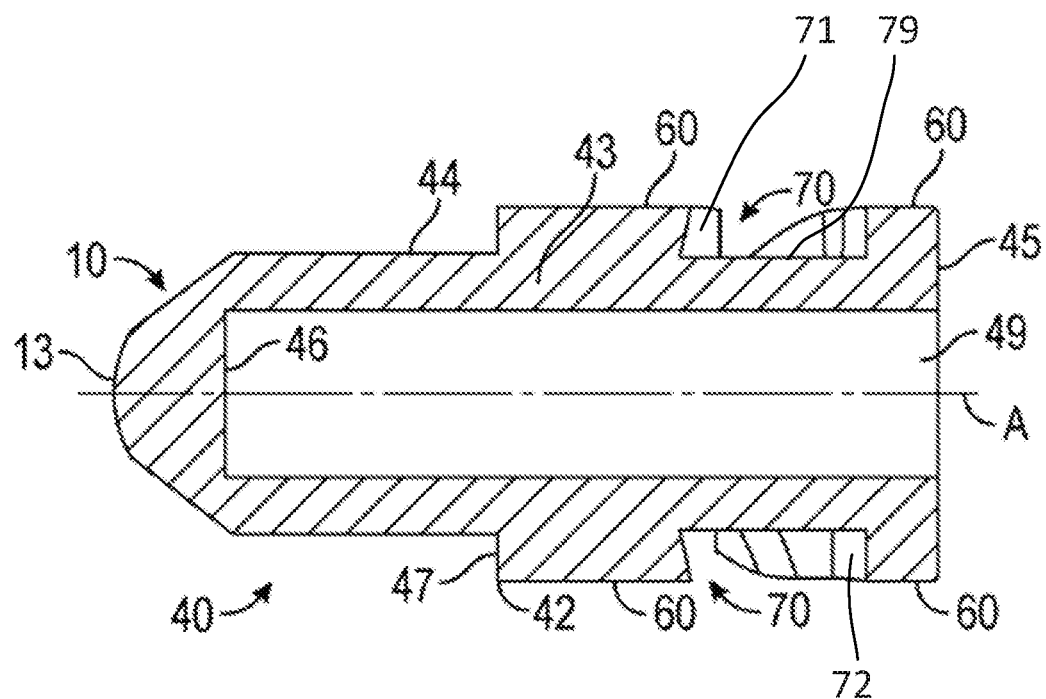
FIG. 8, shows a sectional side view through the push latch piston in FIG. 7, the section taken at VIII-VIII of FIG. 7.
Figure 9:
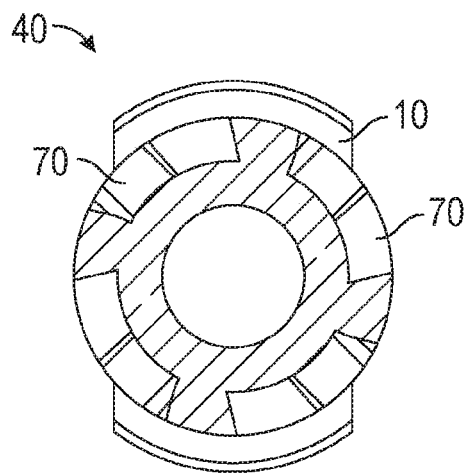
FIG. 9, shows a sectional view in a transverse direction through the push latch piston in FIG. 7, the section taken at IX-IX of FIG. 7.

The push latch piston 40 further comprises an internal cylindrical space 49, which is shown in FIG. 8.

Now turning to FIG. 5, the piston guide 30, as mentioned above, is preferably tubular, having a body 30' with a tubular sidewall 30" encircling a space 38, and a first end 31 and a second end 32, and a bottom wall 36 at the first end 31. The bottom wall 36 preferably has a through-going hole 37, wherein a spring support pin 90 (see FIG. 1) may be fastened, e.g. press fit, in such a way that a portion of the spring support pin 90 extends into the space 38 (not shown) in order to provide support for a resilient member 50 in the form of a spring/compression spring, which is further described below.

The sidewall 30" of the piston guide 30 further comprises one or more (such as four) through-going holes 33, being configured for receiving the same number of guide pins 80, see e.g. FIG. 1. The guide pins 80 may be fastened in the holes 33 in the side wall 30", e.g. by a press fit, in such a way that a portion of each of the guide pins 80 extends into the space 38 (not shown), in order to cooperate with a guide track 70, formed in the push latch piston 40.

The push latch piston 40 is received in, and cooperates with, the piston guide such that the push latch piston 40 is slideably (in the direction of axis A shown in FIGS. 7 and 8) and rotationally (around axis A shown in FIGS. 7 and 8) guided in the piston guide 30.

Figure 4:
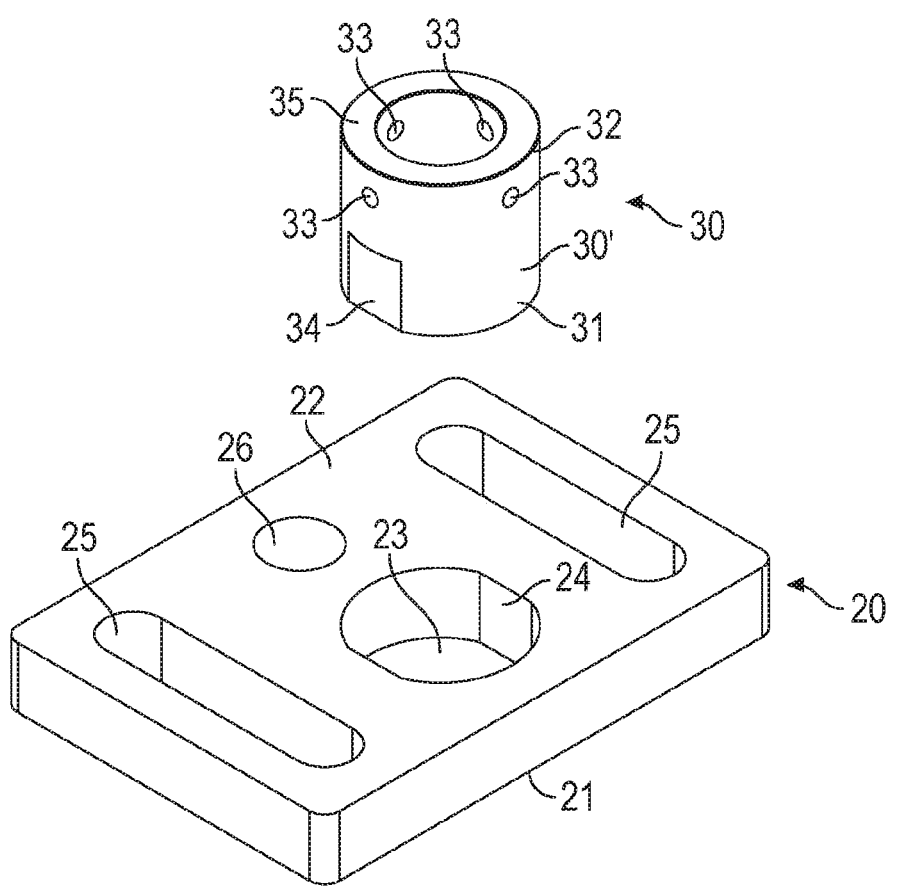
FIG. 4, in a perspective view, shows a base and a piston guide of a push latch according to an embodiment of the invention.

Referring now to FIG. 4, the piston guide 30 may be connected to the base portion 20, e.g. by press fitting the first end 31 of the piston guide 30 into a matching through-going hole 23 formed in the base portion 20. The base portion 20 has a first surface 21 intended for cooperating with a support structure 300, as described above, and an opposite second surface 22 facing. The piston guide 30 is connected to the base portion 20 such that a portion of the piston guide 30 extends above and away from the second surface 22. Preferably, two planar surfaces 24 formed in the side of the throughgoing hole 23 through base portion 20, the planar surfaces corresponding with planar surfaces 34 formed in the outer sidewall at the first end 31 of the piston guide 30.

In the embodiment shown, see particularly FIG. 5, the bottom wall 36 is formed as a part of the piston guide 30. However, in other embodiments, an alternative bottom may be formed by portions of the base portion 20 (not shown).

In the embodiments shown, the piston guide 30 and the base portion 20 are shown as independently formed pieces, joint together. However in other embodiments (not shown), the piston guide 30 and the base portion 20 may be formed as one integral piece/unit.

A resilient member 50, in the form of a spring/compression spring, is arranged between the push latch piston 40 and the piston guide 30, in order to bias the push latch piston 40 towards the extended position.

The resilient member 50 has a body 53, with a first end 51 and a second end 52. The first end 51 is arranged to abut the bottom wall 36 of the piston guide 30. The second end 52 of the resilient member 50 is arranged through the internal space 49, and abuts on an end wall 46 thereof. The end wall 46, as can be seen in FIG. 8, is arranged within the latch portion 10 of the push latch piston 40. The length of the resilient member 50 is adapted such that the push latch piston 40 is biased against the retracted position.

A guide track 70 is formed in a surface 60, which as shown is an outer surface of the push latch piston 40, in the main body 43 thereof, as can be seen in e.g. FIG. 7.

The guide track 70 is located such that it may cooperate with the one or more guide pins 80, which as described above is formed on internal surface of the push latch piston 40. The guide pins 80 extends into the guide track 70, and the length of guide pins 80 is configured such that the push latch piston 40 is stably guided (for rotation) by the guide pins 80 cooperating with the guide track 70.

The guide track 70 has two opposed ledges 71, 72, and a bottom 79, where ledge 72 is arranged towards the first end 41 of the main body 43 and facing the second end 42, and where the opposed ledge 71 is arranged towards the second end 42 of the main body 43 and facing the first end 41. The ledges 71, 72 are formed generally perpendicular to a cylindrical bottom 79 of the guide track 70.

The guide track 70 is formed in sections 70', 70" forming an angle to each other. The guide track 70 is preferably an endless track in that it circumvents the main body 43 of the push latch piston 40. The angled interchanging sections 70', 70" of the guide track 70 thereby forms a zig-zag pattern around the surface 60 in which it is formed.

Corresponding to the sections 70', 70", the ledges 71, 72 are also divided into sections 71', 71" and 72', 72" respectively.

Arrests 73, 74 for the guide pins 80 are formed at intersections of the sections (70', 70"), or more precisely at intersections of each of the ledge sections 71', 71" and 72', 72".

Figure 3A:
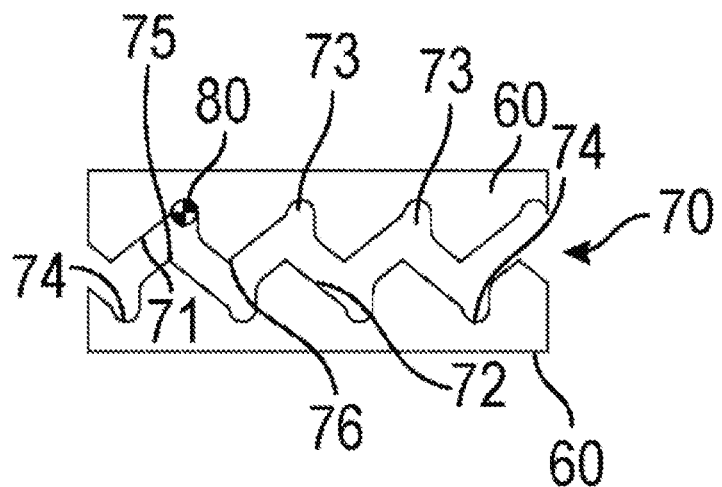
FIGS. 3A and 3A', show a push latch piston (3A) and a planar projection (3A') of a guide track and a guide pin corresponding to the position of the two in FIG. 2A.
Figure 3A:
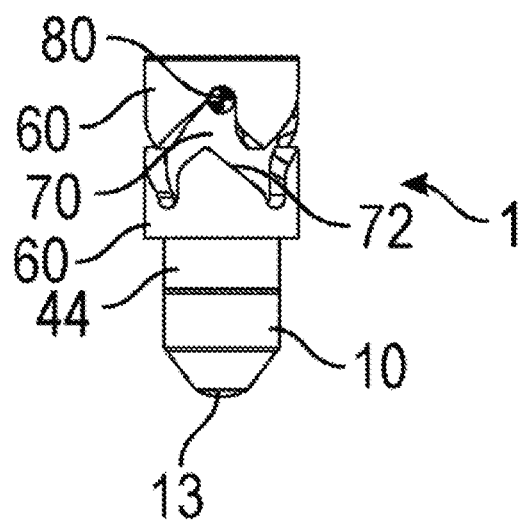

Further, the alternating pattern of the guide track 70 sections 70', 70" forms edges 75, 76, see FIG. 3A. The edges 75, 76 are formed at the convex side of the intersections, and the arrests 73, 74 are formed at the concave side of the intersections between the sections 70', 70".

Looking along either of the two ledges 71, 72 in one direction, the arrests 73, 74 and the edges 75, 76 are repeated: arrest, edge, arrest, edge, . . . , such that the guide pins 80 will encounter them in that order, when the push latch piston is rotated by forcing the push latch piston 40 between the extended and retracted position or vice versa, see more below.

The arrests 73, 74 are configured to receive the pins 80. Preferably, the guide pins 80 are cylindrical in shape, and the arrests 73, 74 have a half-circle cross section, such that they form half-pipes. The diameters of the guide pins 80 and the diameter of the arrests are preferably substantially equivalent.

Figure 3B:
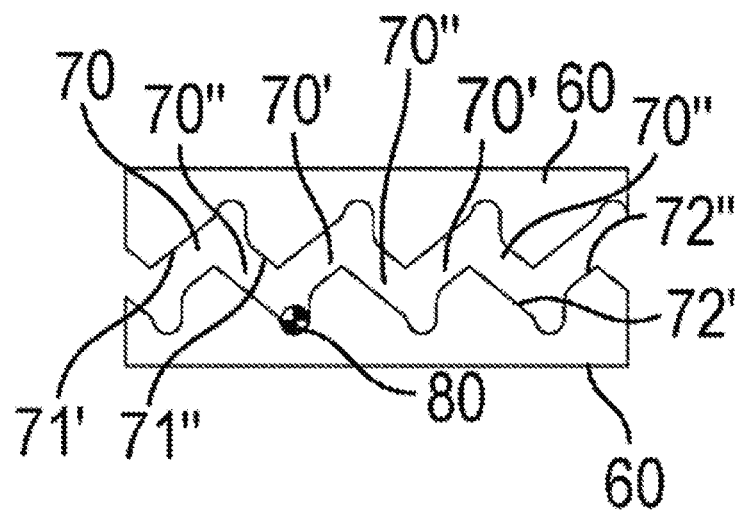
FIGS. 3B and 3B', show a push latch piston (3B) and a planar projection (3B') of a guide track and a guide pin corresponding to the position of the two in FIG. 2B.
Figure 3B:
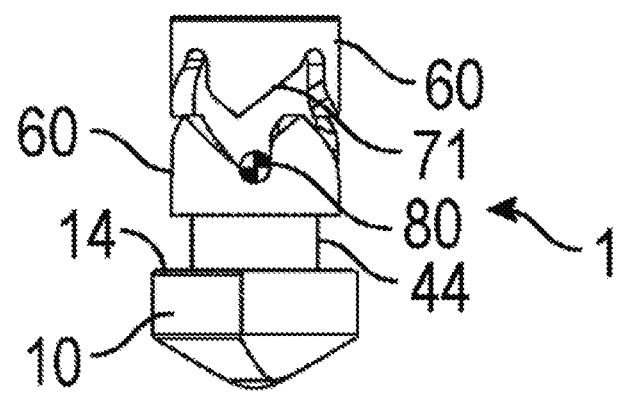
Figure 3C:
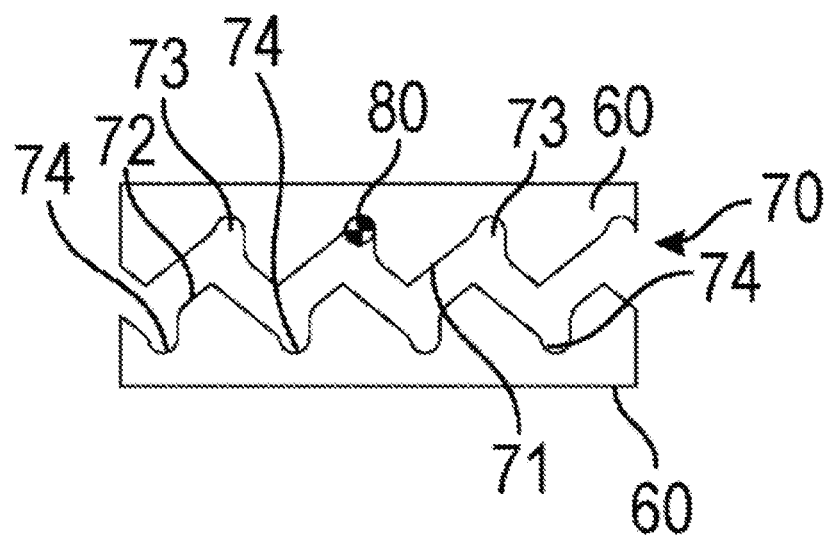
FIGS. 3C and 3C', show a push latch piston (3C) and a planar projection (3C') of a guide track and a guide pin corresponding to the position of the two in FIG. 2C.
Figure 3C:
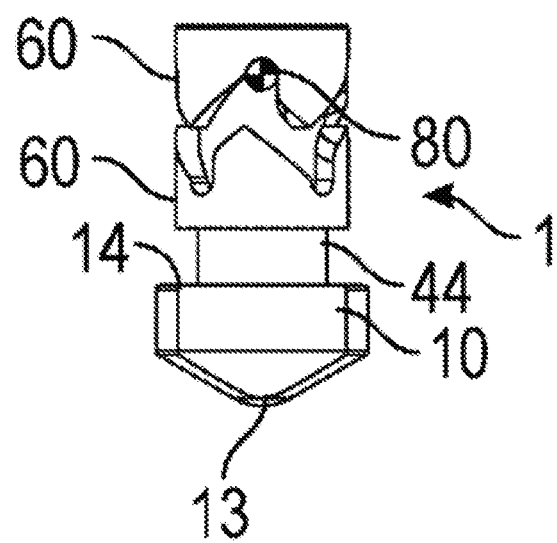

The movement between different positions of the push latch piston 40 relative to the piston guide is depicted in FIGS. 2A-C and correspondingly the movement between different positions of a guide pin relative to the guide track is depicted in FIGS. 3A-C. In FIGS. 3A-C, the outer surface 60 of the main body 43 and the path of the guide track is projected on a plane at the top of each of the figures. Also shown in FIGS. 3A-C is the position of a single guide pin 80. It will be realized that, the push lock may have four guide pins 80 as shown in, e.g. FIG. 1, but that only one is shown in FIGS. 3A-C for the sake of simplicity.

When no external force is applied to the push latch 1, the at least one guide pin 80 is biased into contact with one arrest 73 at the first ledge 71 by the resilient member 50, such that the push latch piston 40 is in the extended position relative to the piston guide 30. This is shown in FIGS. 2A and 3A. This position can also be called an initial rest position. In this position, the larger dimension B of the latch portion 10 is parallel to locking track 210, and may thus be inserted there into, as may be appreciated in FIG. 2A.

As shown in FIGS. 2B and 3B, when the piston guide 30 is moved relative to the push latch piston 40 towards the retracted position, and against the bias of the resilient member 50, the guide pin 80 will interacting with a section 70' of the guide track 70 and rotate the push latch piston 40, and thereby the latch portion 10, to an intermediary position. As shown in FIG. 2B and FIG. 3B, the latch portion 10 is rotated 45° relative to the initial rest position. This is due to the length of the sections 70', 70" of the guide track 70 being equal.

In other embodiments (not shown) the length of each of the sections 70', 70" of the guide track 70 may be adapted to provide other angular positions of the latch portion 10 relative to the initial rest position, such as 30-70° relative to the initial rest position or 40-60° relative to the initial rest position.

As shown in FIGS. 2C and 3C, when the piston guide 30 is subsequently moved back relative to the push latch piston 40, and towards the extended position, by the bias of the resilient member 50, the guide pin 80 interacts with the next portion 70" of the guide track 70 to rotate the latch portion 10 from the 45° to 90° relative to the initial rest position. Thereby, the latch portion 10 can be brought from a rotational position where it can enter through the opening of the locking track 210 of the panel 200, to a rotational position, where the long dimension B of the latch portion 10 is transverse to the opening in the locking track 210 of the panel 200 as described above.

As shown in e.g. FIGS. 3A-C, a maximal outer dimension of the at least one guide pin 80 is smaller than the width of the guide track 70. As mentioned above, preferably, the guide pin 80 has a cylindrical shape, and the maximal outer dimension is identical to the diameter of the cylindrical guide pin 80. When the guide pin 80 dimension/diameter is smaller than the width of the guide track 70, a play between the push latch piston 40 and the piston guide 30 is allowed, which aids the release of the guide pins 80 from the arrests 73, 74.

Further, as shown in e.g. FIGS. 3A-C, an intersection of two ledge sections 71', 71"; 72', 72" forms an edge 75, 76, which is located opposite to an arrest 73, 74, formed on the opposite ledge, and arranged such that, when the piston guide 30 is moved relative to the push latch piston 40 between the retracted and the extended position, or vice versa, rotation of the push latch piston relative to the piston guide is only allowed in one direction. This is done by the edges 75, 76 being slightly allocated relative to the oppositely arranged arrest 73, 74. Thereby, when a guide pin 80 is forced out of an arrest 73, 74 it will abut asymmetrically on an opposite edge, and thereby be forced to move in a specific direction.

As is shown in FIG. 1, a spinning member 100 may be arranged between the second end 52 of the resilient member 50 and the bottom 46 of internal space 49 of the push latch piston 40. The spinning member 100 prevents torsion of the resilient member 50. The spinning member 100 preferably has a guide 110 in the form of a cylindrical body, for interacting with and supporting the resilient member 50. Further, the spinning member 100 has a surface portion 120, in the end opposite the connection with the resilient member 50. The surface portion 120 is adapted to abut on a surface of the push latch piston 40, i.e. the bottom 46 of internal space 49, such that there is minimal friction between the spinning member 100 and the just mentioned surface portion 120. Preferably the surface portion 120 forms a conical part.

The latch portion 10 may be formed integral with the push latch piston 40. However, they may alternatively be formed individually, and assembled into a unit subsequently.

The latch portion 10 and/or the push latch piston 30 may be formed in a metal, e.g. aluminum or stainless steel. Alternatively, the latch portion 10 and/or the push latch piston 40 may be formed in plastic.

Further, the piston guide 30 may be formed in a metal, e.g. aluminum or stainless steel. Alternatively, the piston guide 30 may be formed in plastic.

Yet further, the base portion 20 of the push latch 1 may be formed in a metal, e.g. aluminum or stainless steel. Alternatively, the base portion 20 of the push latch 1 may be formed in plastic.

Figure 11A:
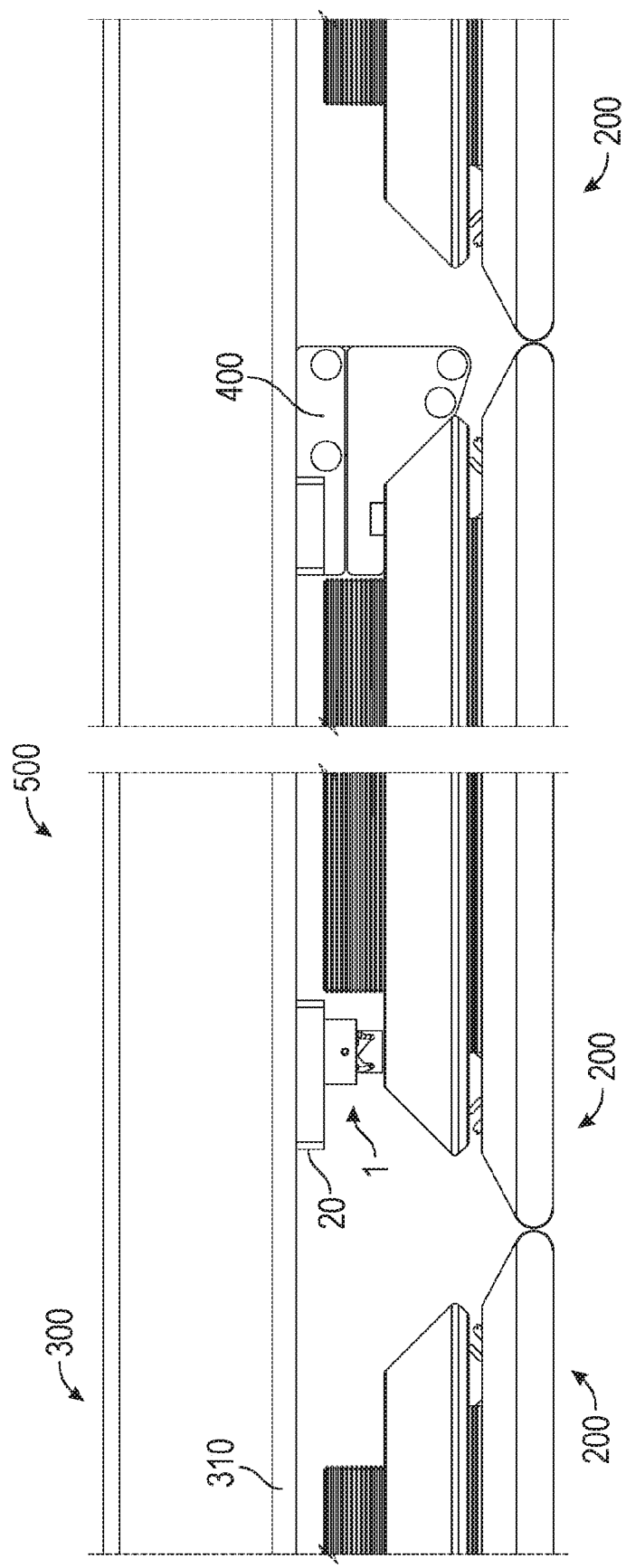
FIG. 11A shows a panel system according to an embodiment of the invention, where three panels are mounted to a support structure using a push latch according to the invention and a hinge joint.
Figure 11B:
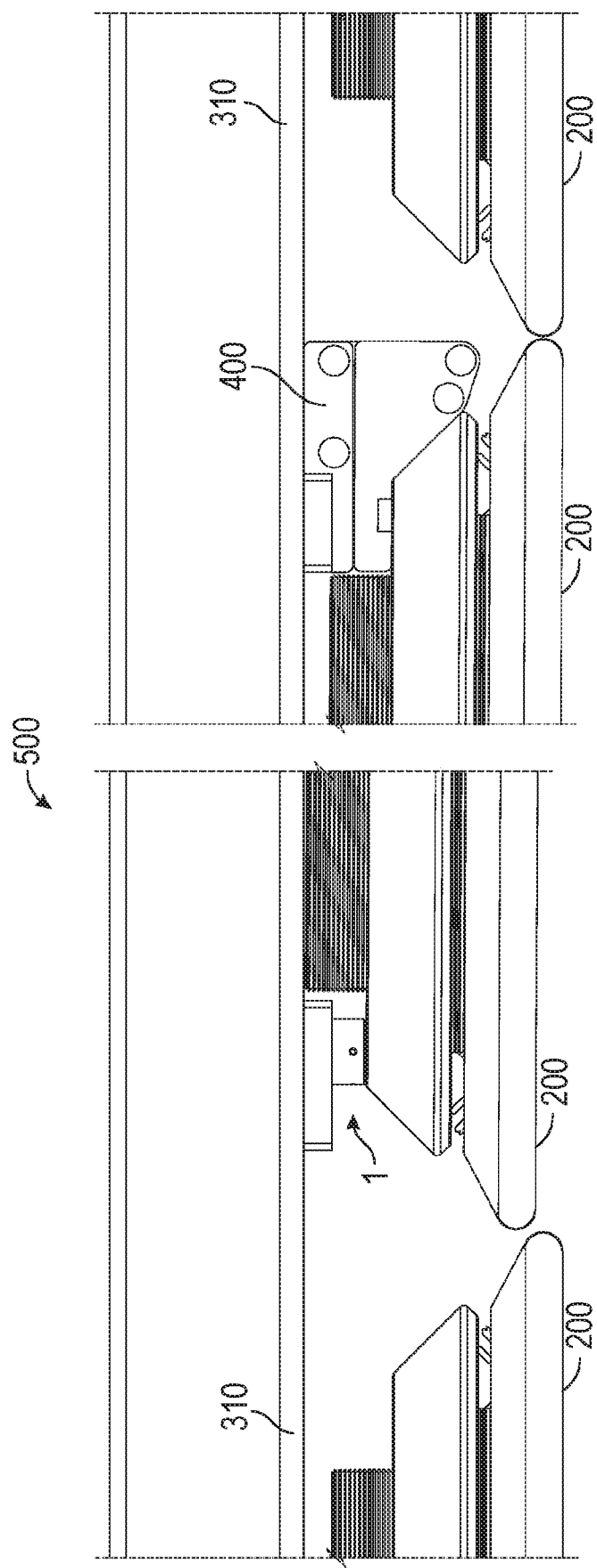
FIG. 11B shows the panel system of FIG. 11A, where a portion of one panel is pushed towards the support structure in order to release the push lock from the panel.
Figure 11C:
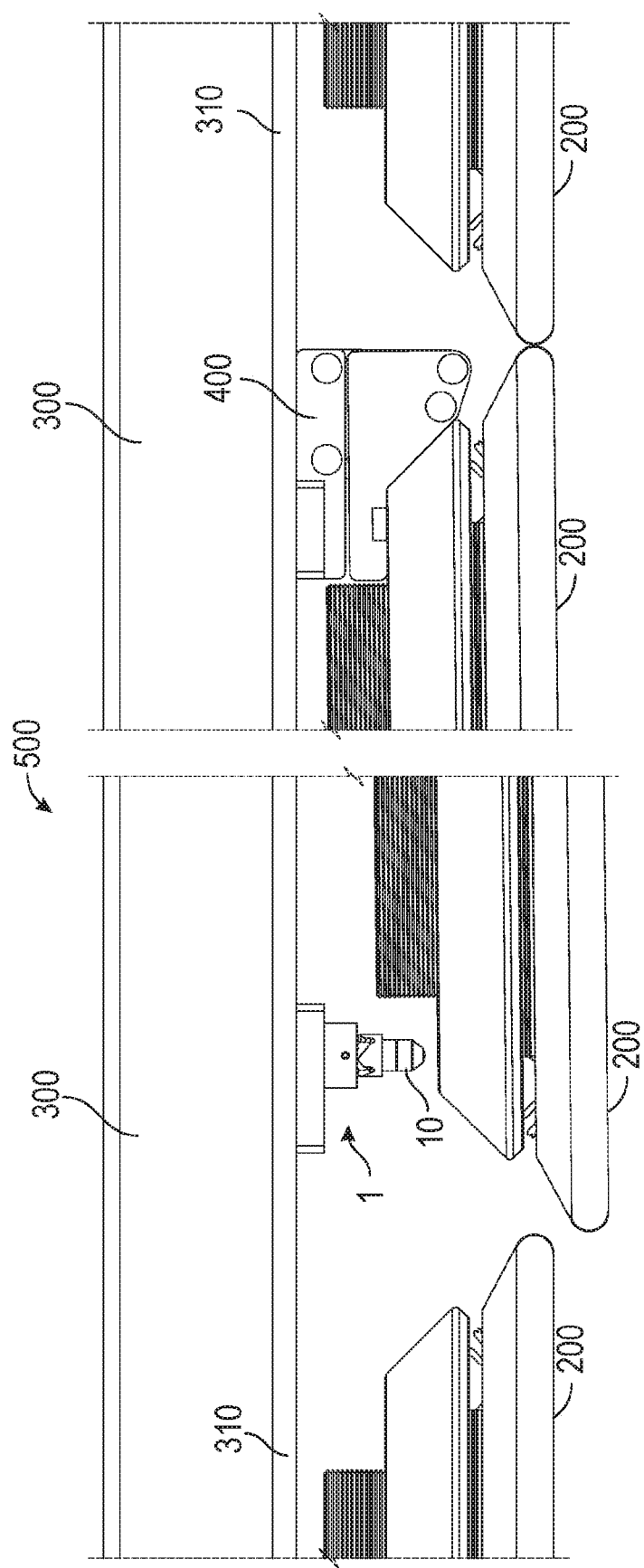
FIG. 11C shows the panel system of FIGS. 11A and 11B, where the push latch has been released.
Figure 11D:
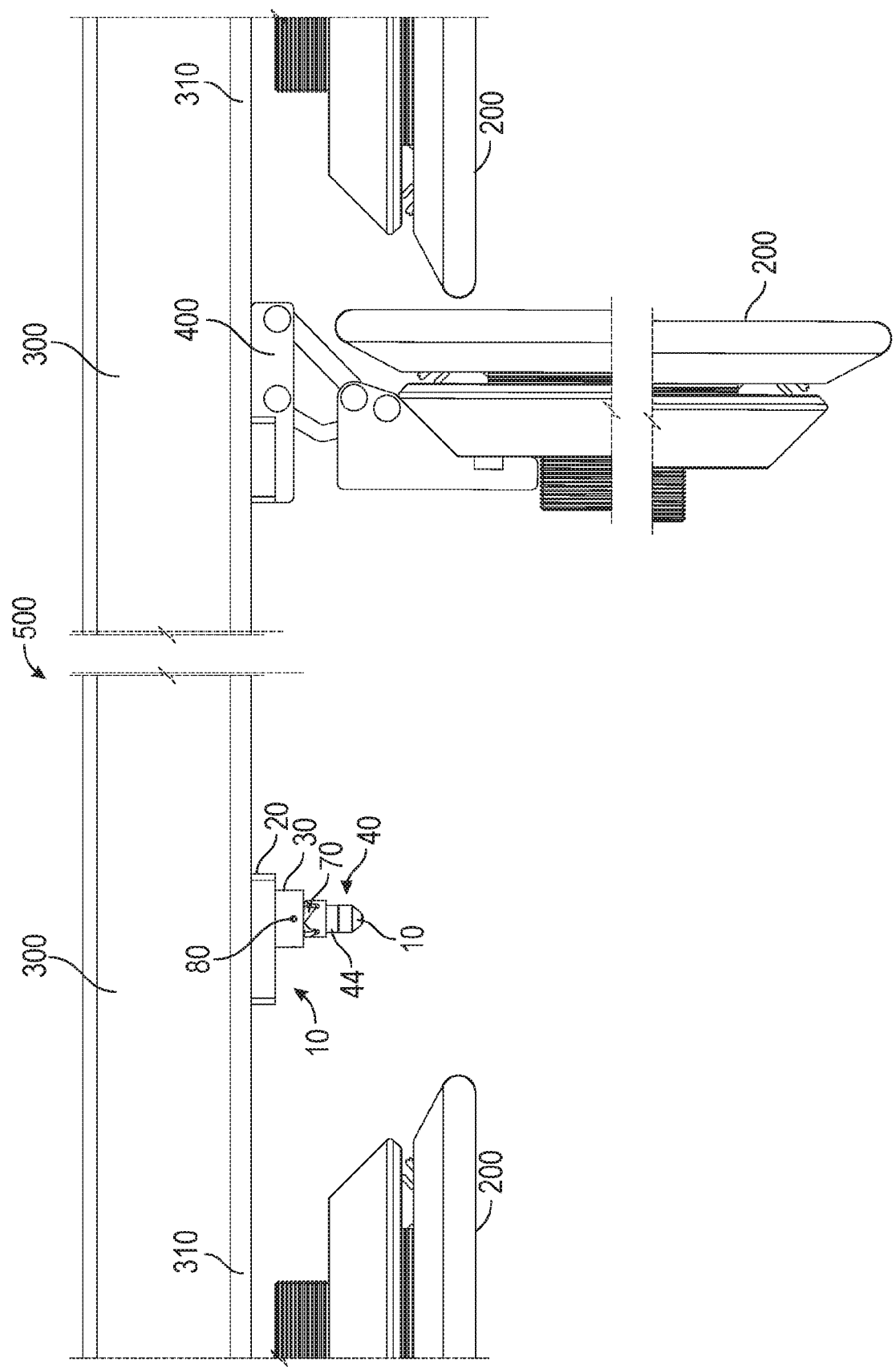
FIG. 11, shows the panel system of FIGS. 11A-11C, where the panel has been opened and is hanging in a hinge joint.

The depth 217 of the locking track 210 may preferably be substantially equivalent with the length of the latch portion 10 from a foremost tip 13 of the latch portion 10 to the locking surfaces 14 of the push latch piston 40. Thereby, it is assured that the latch portion 10 may be stably secured in the locking track 210, in a manner that allows release of the push latch 1 again. This is because this allows abutment of the foremost tip 13 of the latch portion 10 with the bottom surface 211 of the locking track, such that another push on the push latch will provide a new set of rotations as described above, but from a new rest position, where the latch portion 10 is transverse to the locking track in the panel 200. This is shown in FIGS. 11A-C.

Alternatively or additionally, the length (along the direction of axis A) of the locking groove 44 may be adapted such that the second ring shaped end wall 47, when the latch portion 10 is inserted in locking track 210 may abut on the outer surfaces of the flanges defining the opening 216 of the locking track 210. Thereby, the second ring shaped end wall 47 may aid in providing a counter push to operate the push latch, when the push latch is to be released from a locking track 210.

By depth of the locking track 210 is meant the distance from the bottom surface 211 of the locking track 210 to the surfaces 212, 213 of the flanges of the locking track 210, configured for cooperating with locking surfaces 14 on the latch portion 10.

The height 2' of the push latch 1, when the push latch piston 40 is in the retracted position, is preferably substantially equivalent to, or greater than, the distance from a frame abutment surface 220 of the panel to a bottom surface 211 of the locking groove 210. This is shown in FIG. 2B.

By the height of the push latch 1, is meant the distance from the foremost tip 13 of the latch portion 10 to the bottom 21 of the base of the push latch 1. The bottom 21 of the base portion 20 is the surface configured for abutment with the support structure/frame 300.

The frame abutment surface 220 of the panel 200 is the uppermost surface of the panel, which is on the back side, i.e. the side facing the wall or ceiling.

When the height of the push latch 1 (when the push latch piston is in the retracted position) is substantially equivalent to, or greater than, the distance from a frame abutment surface 220 of the panel 200 to a bottom surface 211 of the locking groove 210, it is secured that the full range of the movement of the push latch piston 40 is possible, whereby the panels may be connected to the frame/support structure.

As will be appreciated by comparing FIGS. 2B and 2C, the difference between the height of the push latch 1, when the push latch piston 40 is in the extended position, and the height, when the push latch piston 40 is in the retracted position, preferably 4-20 mm, such as 5-15 mm, such 6-10 mm. Thereby, a suitable distance between the frame/support structure 300 is secured, and operation of the push latch and thereby easy mounting and unmounting of panels 200 to/from the frame/support structure 300 is allowed.

As can be seen in FIGS. 11A-D, panels 200 may further be connected to a flange 310 of the support structure 300 via at least one hinge joint 400. Thus, the panel 200 is connected to the support structure 300 by at least on hinge joint 400 and a push latch 1 as described above. Thereby, the panel 200 may be mounted permanently to the support structure 300, but easily opened like a door or hatch, by manipulating the push latch 1 in the same manner as described above.

Although the teaching of this application has been described in detail for purpose of illustration, it is understood that such detail is solely for that purpose, and variations can be made therein by those skilled in the art without departing from the scope of the teaching of this application.

The term "comprising" as used in the claims does not exclude other elements or steps. The term "a" or "an" as used in the claims does not exclude a plurality.

The invention claimed is:

1. A fastening device for releaseably connecting a panel to a support structure, the panel comprising at least one locking track for receiving a portion of the fastening device, the fastening device comprising:
    a latch portion for connecting the fastening device to the panel;
    a base portion for connecting the fastening device to the support structure;
    a piston guide extending from the base portion;
    a push latch piston movably arranged relative to the piston guide between a first retracted position and a second, extended position, the latch portion being arranged on the push latch piston;
    a resilient member arranged to bias the push latch piston towards the extended position; wherein a guide track is formed in a surface of the push latch piston or in a facing surface of the piston guide,
    wherein at least one guide pin is formed on the other one of the surface of the push latch piston or the facing surface of the piston guide, the guide track being configured to receive the guide pin, wherein the guide track has two opposed ledges, wherein the guide track is formed in sections forming an angle to each other, wherein arrests for the guide pin are formed at intersections of the sections, and wherein,
    when no external force is applied to the fastening device, the at least one guide pin is biased into contact with one of the arrests at a first one of the ledges by the resilient member, such that the push latch piston is in the extended position relative to the piston guide, in an initial rest position,
    when the piston guide is moved relative to the push latch piston towards the retracted position against the bias of the resilient member, the guide pin interacting with the guide track rotates the latch portion relative to the initial rest position to an intermediary position, and
    when the piston guide is subsequently moved back relative to the push latch piston and towards the extended position by the bias of the resilient member, the guide pin interacting with the guide track rotates the latch portion from the intermediary position to 90° relative to the initial rest position.

2. The fastening device according to claim 1, wherein an intersection of a ledge section forms an edge, which is located opposite to one of the arrests formed on the opposite one of the ledges, and arranged such that, when the piston guide is moved relative to the push latch piston between the retracted and the extended position, or vice versa, rotation of the push latch piston relative to the piston guide is only allowed in one direction.

3. The fastening device according to claim 1, wherein the latch portion has two opposed latches, and where a locking groove is formed between a main body portion of the push latch piston and the latch portion.

4. The fastening device according to claim 1, wherein a maximal outer dimension of the at least one guide pin is smaller than a width of the guide track.

5. The fastening device according to claim 1, wherein a spinning member is arranged between the resilient member and the push latch piston.

6. The fastening device according to claim 5, wherein the spinning member has a cone shaped surface.

7. The fastening device according to claim 1, wherein the guide track is formed on an external surface of a cylindrical main body portion of the push latch piston, and the at least one guide pin extends from the facing surface of the piston guide.

8. A panel system for releaseably connecting panels to a wall or a ceiling, the system comprising at least one fastening device configured as in claim 1, at least one panel, and the support structure, the panel comprising the at least one locking track for receiving the latch portion of the fastening device.

9. The panel system according to claim 8, wherein the support structure comprises at least one flange configured for connecting to the base portion of the fastening device.

10. The panel system according to claim 8, wherein the latch portion has two opposed latches, each having a locking surface, and where a locking groove is formed between a main body portion of the push latch piston and the latch portion, and where the locking track of the panel comprises flanges with surfaces configured for cooperating with the respective locking surfaces on the latch portion, a width between edges of the flanges being substantially the same as a maximum dimension of the locking groove.

11. A panel system according to claim 10, wherein a depth of the locking track is substantially equivalent with a length of the latch portion from a foremost tip of the latch portion to the locking surfaces.

12. The panel system according to claim 8, wherein a height of the fastening device, when the push latch piston is in the retracted position is substantially equivalent to, or greater than, a distance from a frame abutment surface of the panel to a bottom surface of a locking groove.

13. The panel system according to claim 12, wherein a difference between a first height of the fastening device, when the push latch piston is in the extended position and a second height, when the push latch piston is in the retracted position, is 4-20 mm, such as 5-15 mm, such 6-10 mm.

14. The panel system according to claim 8, wherein the at least one panel is further connected to a flange of the support structure via at least one hinge joint.

* * * * *